Aug. 17, 1954  J. E. STAGGS  2,686,367
MEASURING TAPE SPRING HANDLE
Filed April 14, 1953
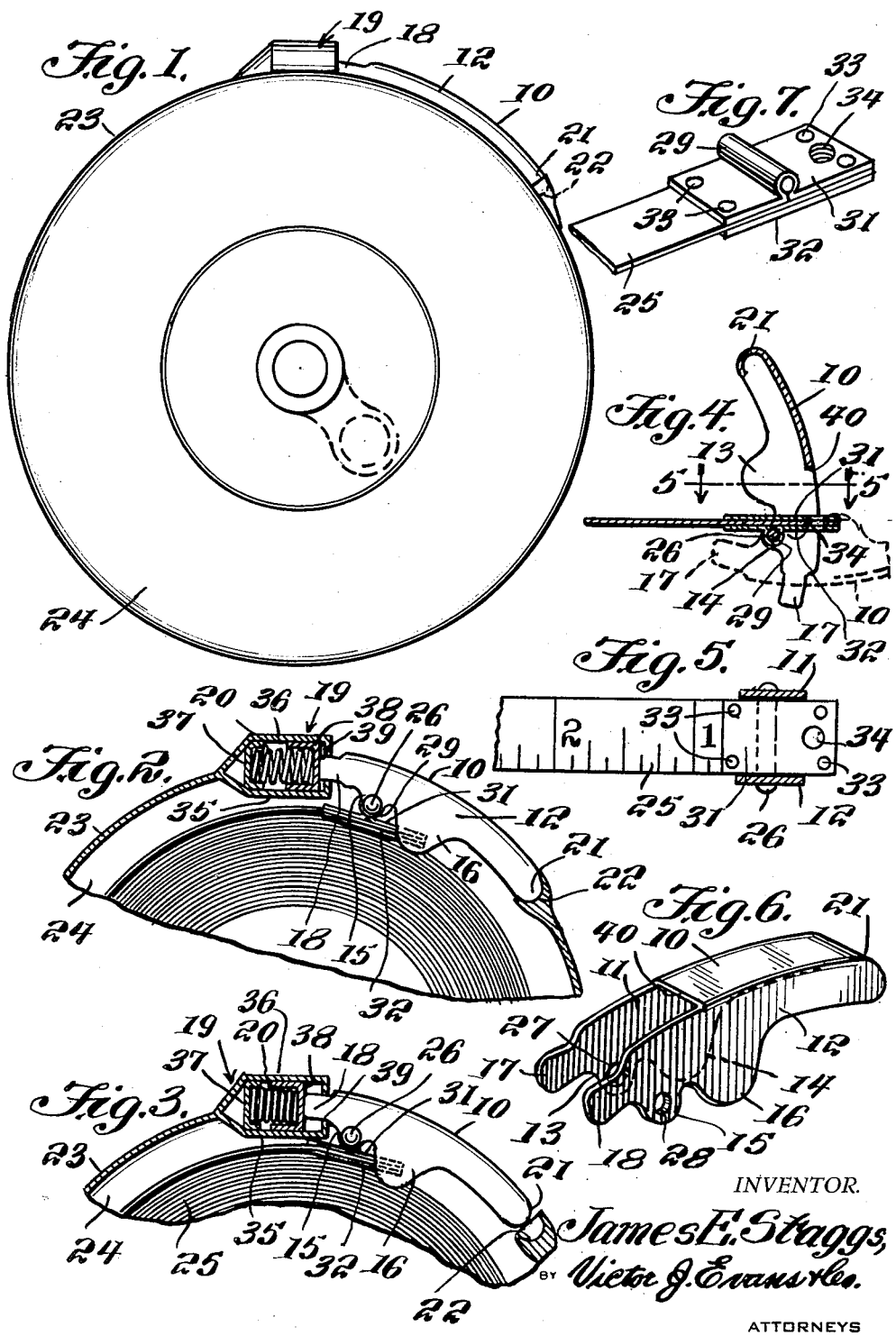
INVENTOR.
James E. Staggs,
BY Victor J. Evans & Co.
ATTORNEYS Patented Aug. 17, 1954

2,686,367

UNITED STATES PATENT OFFICE 2,686,367

MEASURING TAPE SPRING HANDLE

James Earnest Staggs, Kansas City, Mo.

Application April 14, 1953, Serial No. 348,800

4 Claims. (Cl. 33—138)

This invention relates to measuring tape whereing a tape on a spring actuated spool is positioned in a thin circular casing, and in particular a handle pivotally mounted on the end of the tape and positioned whereby a nose of the handle is retained in a socket in the wall of the casing by a spring in a small cylindrical casing also positioned on the circular casing of the tape.

The purpose of this invention is to provide a handle to facilitate holding the end of a steel tape while taking measurements with the tape.

The conventional type of steel tape is provided with a loop that is slightly larger than an opening in the case and this loop is gripped by the thumb and forefinger of a hand for drawing the tape from the case for taking measurements. In some instances and particularly when tape is used with a gloved hand it is difficult to grip the small loop at the end of the tape and it is also difficult to retain the loop in position between the thumb and forefinger. With this thought in mind this invention contemplates a spring handle pivotally mounted on the end of a tape whereby the end of the tape may be positively gripped by hand and whereby the handle is adapted to nest in a position substantially within the limits of the tape case when not in use.

The object of this invention is, therefore, to provide means for mounting a handle on the end of a measuring tape whereby the handle is adapted to nest in an opening in a case in which the tape is positioned.

Another object of the invention is to provide a spring handle and means for mounting the handle on the end of a measuring tape whereby the size of the case in which the tape is positioned is not appreciably increased.

A further object of the invention is to provide a spring handle for measuring tape in which the tape with its case and handle are of a simple and economical construction.

With these and other objects and advantages in view the invention embodies a plate having a cylindrical socket therein secured to the end of a measuring tape with a spring handle, channel-shaped in cross section pivotally mounted by a pin in the socket of the plate on the end of the tape and a spring cylinder positioned at one end of an opening in a case in which the tape is positioned and adapted to retain the spring handle in the opening with the opposite end of the handle nested in a socket at the opposite end of the opening.

Other features and advantages of the invention will appear from the following description taken in connection with the drawing, wherein:

Figure 1 is a side elevational view of a measuring tape case showing the spring handle of this invention nested in the tape opening of the case.

Figure 2 is a detail showing a longitudinal section through the portion of the tape case in which the opening is positioned showing the spring handle nested in the opening and showing the parts on an enlarged scale.

Figure 3 is a section similar to that shown in Fig. 2 showing the spring handle partly withdrawn whereby the opposite end is released from a socket in the opposite end of the opening in which the handle is positioned.

Figure 4 is a longitudinal section through the end of a tape showing the spring handle pivotally mounted on the tape and showing the handle in an upwardly extended position in full lines and in a position against the tape in dotted lines.

Figure 5 is a sectional plan taken on line 5—5 of Fig. 4 showing the end of the tape with side flanges of the handle shown in section.

Figure 6 is a perspective view of the spring handle illustrating the design and construction thereof.

Figure 7 is a detail showing the mounting plate attached to the end of the tape with other parts omitted.

Referring now to the drawing wherein like reference characters denote corresponding parts the improved spring handle of this invention includes a body member formed with a back or web 10 having flanges 11 and 12 at the sides, with extensions 13 and 14 on the extended edge of the flange 11 and 15 and 16 on the extended edge of the flange 12, and the flanges at one end of the handle are provided with projections 17 and 18 which extend into a casing 19 in which a spring 20 is positioned, whereas at the opposite end of the handle the flanges in combination with the web 10 form a nose 21 that is positioned to extend into a socket 22 at the opposite end of an opening in a wall 22 of a case 24 in which a tape 25 on the end of which the spring handle is pivotally mounted by a pin 26 is positioned.

The extensions 13 and 15 of the flanges 11 and 12 of the spring handle are provided with openings 27 and 28, respectively into which the ends of the pin 26 extend and with the pin pivotally mounted in a transversely disposed socket 29 that is mounted on a tape 25 with a base plate 31 the spring handle is pivotally mounted on the end of the tape. A reinforcing plate 32 may be positioned on the opposite side of the tape and the plate may be secured in position on the tape with pivots, or other fasteners, as indicated by the numeral 33. The end of the tape is provided with an opening 34 and, as illustrated in Fig. 7, the opening extends through the plates 31 and 32 to provide means for holding the end of the tape.

As illustrated in Fig. 2 the casing 19 is provided with an inner wall 35 and an outer wall 36 and the spring 20 is positioned against a partition 37 at one end and a slider 38 at the other. The slider is urged toward the end of the casing in which the opening 39 is provided for receiving the projections 17 and 18.

With the parts released the spring 20 urges the spring handle away from the casing 19 whereby the nose 21 on the opposite end is urged into the socket 22 so that the spring handle is resiliently held in the tape receiving opening through the wall 23 of the case.

With the parts arranged in this manner the spring handle is nested in the opening in the wall of the case of the tape when the device is not in use and by pulling backwardly slightly on the spring handle the nose 21 thereof is readily released from the socket 22 whereby the handle with the tape attached thereto may be withdrawn from the casing when it is desired to use the tape. With the spring handle pivotally mounted on the tape it is free to swing in different positions as illustrated in Fig. 4. With the web or back 10 of the spring handle terminating at the point 40 the end of the tape is free to pass through the handle.

It will be understood that modifications, within the scope of the appended claims, may be made in the design and arrangement of the parts without departing from the spirit of the invention.

What is claimed is:

1. A steel tape handle comprising an elongated body, channel shaped in cross section having a back with flanges at the sides and said flanges having projections extended from one end of the handle, the flanges and back being formed to provide a nose at the opposite end of the handle, said flanges having extensions with openings therein spaced from the ends on which the projections are positioned, and means for pivotally mounting said handle on the end of a measuring tape through said openings of the extensions.

2. In a measuring tape holder, the combination which comprises a thin cylindrical casing having an annular wall with an opening therein, said wall having a recess therein and said recess positioned at one end of the opening, a spool in said casing, a measuring tape on said spool, a handle, channel-shaped in cross section mounted on the extended end of the tape, and means for resiliently retaining the handle in the annular wall of the casing with one end of the handle nested in the recess positioned at one end of said opening of the wall.

3. In a measuring tape holder, the combination which comprises a thin cylindrical casing having an annular wall with an opening therein, a spool in said casing, a measuring tape on said spool, a handle, channel-shaped in cross section mounted on the extended end of the tape, said annular wall of the casing having a socket therein positioned at one end of said opening and having a casing thereon positioned at the opposite end of the opening, a spring in the last named casing and said handle having projections positioned to extend into the last named casing for compressing the spring on one end and a nose on the opposite end positioned to nest in said socket on the wall of the first named casing.

4. In a measuring tape holder, the combination which comprises a thin cylindrical casing having an annular wall with an opening in said wall, a spool journaled in the casing, a measuring tape on said spool, a plate having a transversely disposed socket thereon secured to the end of the tape, a handle, channel-shaped in cross section having a back with flanges at the sides positioned over the end of the tape, a pin extended through the socket mounted on the tape and extended into openings in the flanges of the handle for pivotally mounting the handle on the tape, said annular wall of the casing having a socket therein positioned at one end of the opening in the wall and having a casing formed therein and positioned at the opposite end of said opening, a spring in said last named casing positioned at the opposite end of the opening, a washer providing a follower positioned between the end of the spring and an open end of the last named casing, the flanges of said handle having projections thereon positioned to extend into the last named casing, and said handle having a nose on the opposite end positioned to nest in the socket formed in the annular wall at the opposite end of the opening whereby the spring urges the nose into the socket thereby retaining the handle in a position nested in the opening of the annular wall of the first named casing.

References Cited in the file of this patent

UNITED STATES PATENTS

| Number | Name | Date |
| --- | --- | --- |
| 578,205 | Brown et al. | Mar. 2, 1897 |
| 2,469,674 | Witchger | May 10, 1949 |
| 2,481,638 | Borup | Sept. 13, 1949 |